Feb. 13, 1951 F. A. GRUETJEN 2,541,243
BALANCE WEIGHT CALCULATOR
Filed March 3, 1945 2 Sheets-Sheet 1

Frederick A. Gruetjen
INVENTOR.

BY *[signature]*
ATTORNEY.

Feb. 13, 1951  F. A. GRUETJEN  2,541,243

BALANCE WEIGHT CALCULATOR

Filed March 3, 1945  2 Sheets-Sheet 2

Frederick A. Gruetjen
INVENTOR.

BY
ATTORNEY.

Patented Feb. 13, 1951

2,541,243

UNITED STATES PATENT OFFICE 2,541,243

BALANCE WEIGHT CALCULATOR

Frederick A. Gruetjen, Milwaukee, Wis., assignor to A. O. Smith Corporation, Milwaukee, Wis., a corporation of New York Application March 3, 1945, Serial No. 580,892

11 Claims. (Cl. 235—61)

This invention relates to a balance weight calculator and finds particular employment in determining the correct angular position of balance weights in a hollow steel propeller blade to effect vertical balance of the blade.

One object of the invention is to provide a balance weight calculator that locates balance weights in the correct angular position within a propeller blade to effect vertical balance if the blade.

Another object is to provide a balance weight calculator that will calculate the proper and correct location of balance weights in any object the weights are capable of balancing.

Another object is to provide a simple, inexpensive and accurate device to determine the proper angular position of balance weights in a propeller blade for obtaining vertical balance of the blade within very close manufacturing limits.

A further object is to provide a calculator device that is readily portable from place to place and easily operated by even an unskilled workman.

Another object is to provide a balance weight calculator that determines the angular location of weights in a propeller blade to eliminate unbalance found in either the camber or face of the blade or in the leading or trailing edge thereof.

A further object is to provide a quick and accurate way to locate weights in a blade shank to correct vertical unbalance of the blade.

In the manufacture of hollow steel propeller blades it is difficult to fabricate a blade in which vertical balance is present within the close tolerance limits that are desired. With the operation of propeller blades under present day speeds and the wide use of variable pitch mechanism to change the pitch of blades in service, it becomes necessary for smooth and effective operation of an airplane and for blade life that each blade of the plane be in substantially perfect balance both horizontally and vertically.

In order to obtain substantially perfect vertical balance of a hollow steel blade, balance weights, which in general comprise a pair of weights movable angularly relative to each other have been secured in the shank or root of the blade in the proper relative angular position to correct any vertical unbalance that may exist after fabrication.

The unbalance arising from fabrication is defined within close tolerance limits and the calculator device of the present invention has been devised to quickly and accurately mechanically calculate the relative angular positions in the root of the blade where the balance weights are to be located to correct the determined existing unbalance of the blade on its longitudinal axis.

In addition to the above named objects other objects and advantages of the invention appear hereinafter in connection with the description of an embodiment of the invention illustrated in the accompanying drawing.

Figure 1:
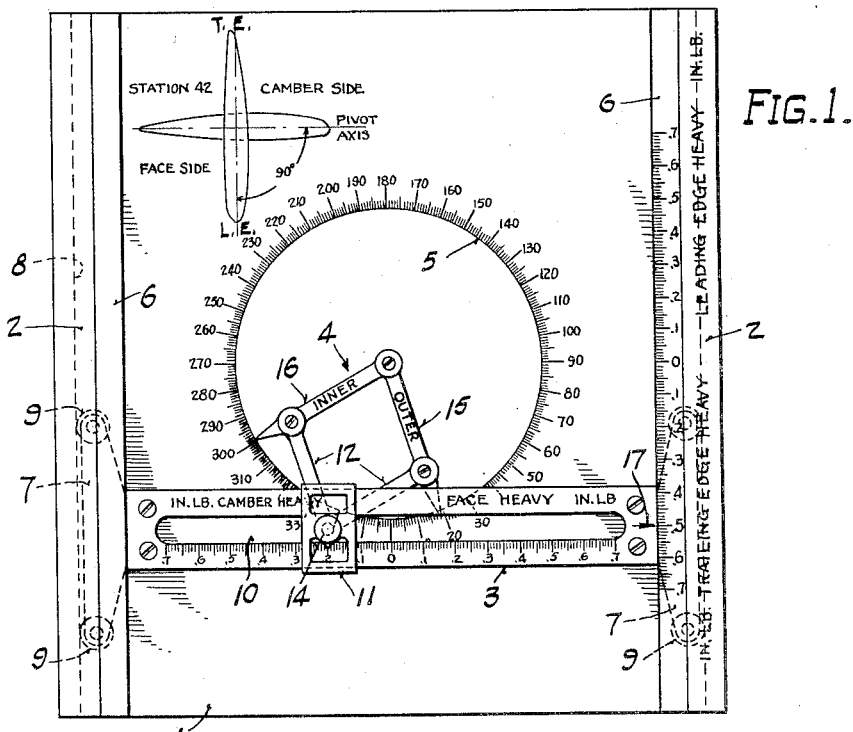
Figure 1 is a top plan view of the balance weight calculator constituting the invention and showing the position of the parts when the camber foil has an overweight unbalance of .2 inch pound and the trailing edge has an overweight unbalance of .5 inch pound.

The balance weight calculator of the invention, in general, comprises the base plate 1, the guide strips or unbalance indicating members 2 suitably secured to the base plate at opposite edges thereof, a slide or unbalance indicating member 3 disposed within strips 2 for movement across the face of plate 1, and a parallelogram arrangement of arm members 4 operable by slide 3 and pivoted to the upper face of base plate 1 at the center of a circle 5 inscribed on the central portion of the plate.

Circle 5 is provided around its circumference with scale marks from zero to 360, indicating degrees, the numbers preferably increasing in a counterclockwise direction from the zero until the zero mark is again reached. As illustrated in Figure 1, the zero mark of the scale may be located on the circumference of circle 5 at the point nearest the operator located by a vertical line through the center of the circle. The significance of the degree marks around the circumference of circle 5 will be more fully described hereinafter.

The guide strips 2 are disposed opposite each other, one to the right and one to the left of circle 5, as shown in Figure 1, and each strip is provided on the inside, longitudinally thereof, with the beveled face 6. The remainder of each comprises a flat plane surface. One of the strips 2, such as the one to the right of circle 5 in Figure 1, includes calibrations on the beveled face 6 and words on the plane surface.

Referring to the calibrations on face 6 of strip 2 as illustrated in Figure 1, strip 2 is divided into two equal parts by a zero mark disposed on a straight horizontal line through the center of circle 5. The values indicated on face 6 represent inch pounds in denominations of tenths and increase in opposite directions from the zero mark until seven-tenths inch pound is reached.

The value given the marks may be other than inch pounds and the inch pounds here used may be defined as the weight of one pound at a radial distance of one inch from the vertical axis of the propeller blade or other object to be balanced.

Looking now at the calculator from the right in Figure 1, the flat portion of strip 2 to the left of the zero mark on face 6 is inscribed with the words "In. Lb. Trailing Edge Heavy" and to the right of the zero mark with "Leading Edge Heavy In. Lb."

The marking up to seven-tenths inch pound on the left side of strip 2 indicates at least the total inch pounds of unbalance the balance weights employed, not shown, will correct in the trailing edge of the propeller blade. The markings up to seven-tenths inch pounds on the right side of strip 2 indicate at least the total inch pounds of unbalance the balance weights will correct in the leading edge of the blade.

Slide member 3 disposed between those portions of strips 2 projecting upwardly from plate 1 to facilitate movement of member 3 across the face of the plate, is provided with end guide pieces 7 at either end thereof. The end guide pieces 7 rest within slots 8 in strips 2 to prevent binding of member 3 in its movement over the face of plate 1.

To additionally facilitate the manipulation of slide 3 guide rollers 9 are preferably horizontally disposed in the outer ends of each guide piece 7 to bear in slots 8. These rollers may be supplemented by additional rollers, such as pin rollers extending vertically at right angles to the guide rollers. Stops may also be provided at each end of the respective slot 8 to limit the movement of slide 3.

Extending longitudinally of the slide 3 is the central slot 10. A slider member 11 is disposed within the slot 10 and is readily movable therein.

Slide 3 is divided into two equal sections by a zero mark appearing on the face of the slide nearest the operator and disposed on a horizontal line through the center of circle 5. The values indicated on the slide face are the same as those on guide strip 2 previously described, representing inch pounds in denomination of tenths and increasing in opposite directions from the zero mark until seven-tenths inch pounds is recorded at each side.

On the upper or top portion of the face of slide 3 and to the left of the zero marking above described are the words "In. lb. camber heavy" and to the right of the zero marking appear the words "Face heavy in. lb."

The marking seven-tenths inch pounds on the right side of the zero designation indicates at least the total inch pounds of unbalance the balance weights will correct in the face of the blade. Correspondingly the seven-tenths inch pounds markings to the left of the zero designation indicates at least the total inch pounds of unbalance the balance weights will correct in the camber foil of the blade.

Slider member 11, previously described, carries a center line to accurately dispose the slider over the marking on the face of slide 3 that it is desired to designate.

A pair of toggle arms 12 are pivoted at their one end to the center of slider member 11 by a suitable screw and bushing arrangement 13. A knob 14 may be secured to screw and bushing 13 to provide for movement of slider 11 longitudinally of slide member 3.

The other end of one toggle arm 12 is pivoted to the pointer arm 15 and the corresponding end of the other toggle arm 12 is pivoted to the pointer arm 16. The manner of securement of arms 12 to slider 11 permits slide 3 to move over the toggle and pointer arms should this be necessary.

Pointer arms 15 and 16 are in turn pivoted to base plate 1 at the center of circle 5 by a suitable screw and bushing. The arm 15 may be designated with the term "Outer" and arm 16 may be designated "Inner" to thereby indicate the balance weights. "Inner" has reference to the inner disposed weight and "Outer" to the outer disposed weight, when the weights are assembled together in the propeller blade to be balanced.

Pointer arms 15 and 16 are beveled and tapered to a point at their outer ends to facilitate designation of the degree markings on circle 5. The pivot points of toggle arms 12 on the respective pointer arms 15 and 16 also are slightly removed from the point of each pointer arm to facilitate designation of the degree markings on circle 5.

The pivot points of the toggle arms and pointer arms move through the same circumferential path whenever the arms 12, 15 and 16 are manipulated. In the figures illustrating the invention the distance from the pivot point of pointer arm 15 to the center of circle 5 is .35 inch pound or the value of the outer disposed balance weight. The distance from the pivot point of pointer arm 16 to the center of circle 5 is also .35 inch pound or the value of the inner disposed balance weight.

The length of either guide strip 2 or slide 3 both to the right and left of the zero marks thereon should extend at least as much as twice the distance of either pointer arm 15 or pointer arm 16 from their respective pivot point to the center of circle 5 to permit calculation of the correct angular position of the balance weights for the full range of their usefulness.

The distance between the pivot points of the respective toggle arms 12 is also equal to the distance between the center of circle 5 and the pivot point of either arm 15 or 16 to provide four arm members pivoted together at points equi-distant from each other.

The pivoting of pointer arms 15 and 16 to the center of circle 5, and the pivoting of each toggle arm 12 to a respective pointer arm at one end and to the slider member 11 at the other end provides the parallelogram 4 by which the parallelogram law of forces is mechanically employed to calculate the proper angular position of balance weights in a propeller blade to correct unbalance in the blade.

In determining the unbalance of a propeller blade the transverse reference line on the particular blade along which the balance is taken may lie at any station on the blade. In Figure 1, the reference line is located at station forty-two as the station at which the blade balance has been taken, station forty-two being determined at forty-two inches from the theoretical center of the propeller hub.

For purposes of assistance to the operator, as illustrated in Figure 1, the upper left hand corner of plate 1 may have inscribed thereon, a transverse section taken at station forty-two of two propeller blades placed at right angles to each other. The blades disposed in this manner form four quadrants of a circle. In the upper left hand quadrant is the legend "Station 42." In the upper right hand quadrant is the legend "Camber side." The lower left hand quadrant is denoted "Face side" and the lower right hand quadrant is marked "90" degrees.

The horizontally disposed section at the right side is denoted "Pivot axis." The vertically disposed blade section is marked "T. E." or trailing edge on the upper smaller end and "L. E." or leading edge at the larger lower end.

In comparing the described transverse section in the upper left hand corner of Figure 1 with the marks on unbalance indicating member 3, the legend "In. lb. camber heavy" appears to the left of the zero marking whereas in the transverse sectional illustration the legend "Camber side" is on the left side of the zero marking or index line and in a quadrant opposite to the quadrant in which the legend "In. lb. camber heavy" appears. The reason for this layout is indicated by the fact that if unbalance heaviness appears in the camber foil the weights must be placed opposite thereto to correct the determined unbalance. This is likewise true of determined unbalance in either the face foil or the trailing or leading edge of the blade.

When the proper angular position of the weights has been determined by the calculator they are preferably transferred to another device for marking the weights such as that disclosed in Patent No. 2,532,225, granted to the same inventor, assigned to the present assignee, and entitled "Balance Weight Positioner." The marked weights are then secured in the propeller blade with the mark on the weights coinciding with the trailing edge index line.

For purposes of illustration only, Figure 1 has been drawn to illustrate the determined unbalance of a particular propeller blade in both the trailing edge and camber foil. For example it has been determined after fabrication of this particular propeller blade that at station forty-two the trailing edge is .5 inch pound heavy out of balance and that the camber foil is .2 inch pound heavy out of balance. This disposes the blade as vertically out of balance or unbalanced around its longitudinal axis. The problem is to determine where balance weights may be located in the root of the blade to correct the .5 inch pound overweight unbalancing force in the trailing edge and the .2 inch pound overweight unbalancing force in the camber foil.

As illustrated in Figure 1, the inch pounds out of balance of the trailing edge is indicated by locating slide 3 on plate 1 so that pointer 17 on the right side of the slide points to the .5 inch pound mark on strip 2 on the trailing edge section of the guide strip. The .2 inch pound out of balance of the camber foil is indicated by locating the center line of slider 11 in slot 10 of slide 3 at the .2 inch pound marking in the camber section of slide 3.

When slide 3 and slider 11 are moved to the positions described the calculator pointer arms 15 and 16 move circumferentially. Arm 15 comes to rest on the scale of circle 5 at approximately 18° to indicate the angular position at which the outer balance weight is to be placed in the blade with reference to an index line through the apex of the trailing edge represented by the zero 180 degree line. Arm 16 rests at about 299° on the circle scale as the angular position at which the inner balance weight is to be placed with reference to the index line through the apex of the trailing edge which is the zero 180 degree line on the calculator.

The balance weights are soldered or otherwise secured within the propeller blade at the angular positions determined by the calculator in the manner described.

Figure 2:
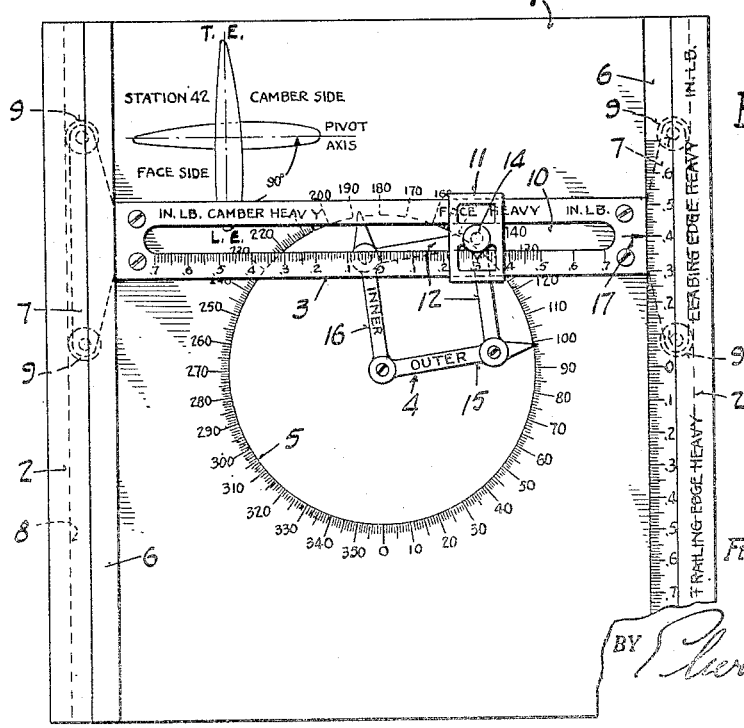
Fig. 2 is a top plan view of the calculator for an overweight unbalance of .4 inch pound in the leading edge and .3 inch pound in the face foil of a blade.

Fig. 2 illustrates the position of the pointer arms 15 and 16 where unbalance in a propeller blade has been determined to be .4 inch pound overweight in the leading edge and .3 inch pound overweight in the face foil. As shown the pointer of arm 15 is positioned at about 98° on the scale of circle 5 and pointer arm 16 is positioned at approximately 187° on the scale of circle 5, to thereby designate the angular position of the weights with reference to the trailing edge index line to correct the determined unbalance in the propeller blade.

Figure 3:
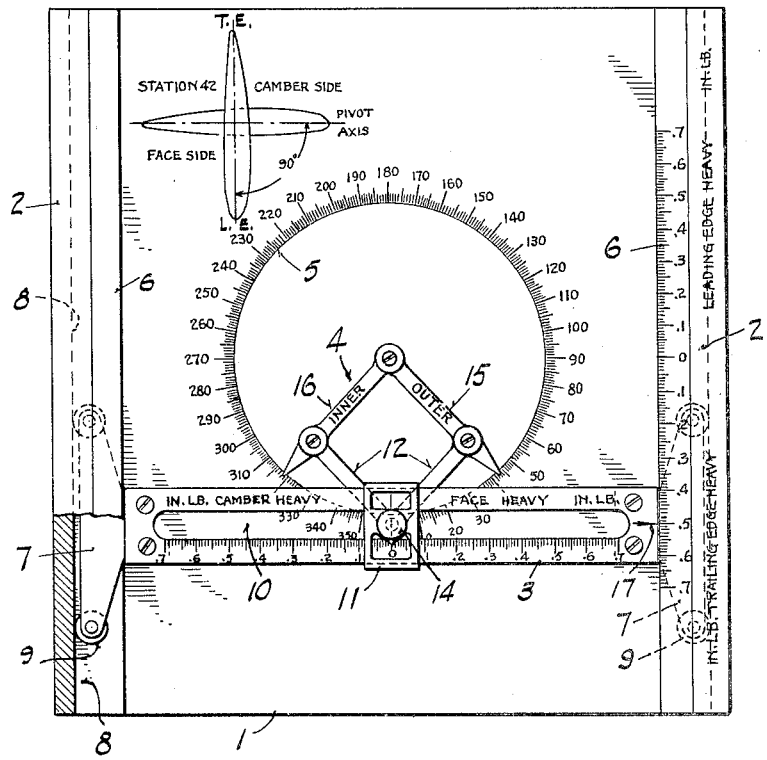
Fig. 3 is a top plan view of the calculator when there is unbalance of the propeller blade in only one direction in the amount of .5 inch pound in the trailing edge.
Figure 4:
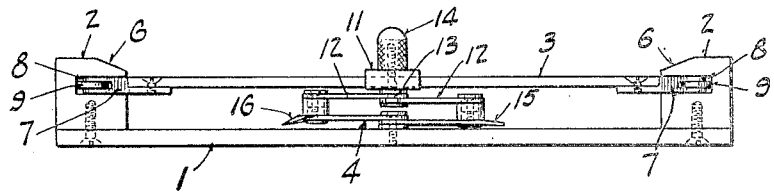
Fig. 4 is an end view of the calculator.

If there is unbalance in the blade in one direction only, the vector of unbalance lies on either the zero-180 degree line or the ninety-270 degree line of circle 5. Fig. 3 illustrates this condition of unbalance by showing the position of the pointer arms when there is an unbalance of .5 inch pound solely in the trailing edge. Pointer arm 15 lies on about the 43° scale mark of circle 5 and pointer arm 16 indicates approximately 317° thereon to illustrate the angular positions the weights are to be placed in the blade with reference to the index line therethrough to correct the determined unbalance of .5 inch pound in the trailing edge.

Although the calculator mechanically designates the angular positions the weights are to be placed the calculations of the calculator may be checked readily by employing the recognized rules of triangles and trigonometry. The parallelogram that is formed by the equal fixed arms 12, 15 and 16 may always be divided into four equilateral triangles. Any one of these triangles may be employed to check the calculator mathematically.

Balance weights having either greater or lesser value than those employed may be utilized with the qualification that the weights be of equal value. In the event that balancing correcting weights of a value other than .35 inch pound are employed, arms equal to the value of the balance weights would have to be provided in parallelogram 4.

The invention provides a quick, accurate calculating device that insures that a propeller blade or other rotary object will be balanced by the locating of balancing weights in the proper position within close tolerance limits that approaches substantially perfect balance.

Various embodiments of the invention may be employed within the scope of the accompanying claims.

I claim:

1. In a balance weight calculator for calculating in increments of degrees from zero to 360 the correct angular position of balance weights in a propeller blade to effect vertical balance thereof where unbalance has been determined and having means to register the unbalance of the blade when determined, a plate member, a circle inscribed on said plate member and graduated in degrees from zero to 360, a pair of correlated members pivoted to the center of the plate circle and disposed to designated degrees on said circle, and an additional pair of correlated members pivoted to said registering means at one end and respectively to the corresponding first named correlated members at the other end to thereby join all of said members together to provide a parallelogram thereof, the latter named correlated members being actuated by said means to move the first named actuated members to the degree positions on said circles the weights are to be placed to correct the determined unbalance.

2. A balance weight calculator for calculating the correct angular position of balance weights in a rotary object to effect vertical balance thereof where unbalance has been determined, comprising a plate member having a circle on the face thereof inscribed in increments of degrees, unbalance indicating members on said plate member at right angles to each other with each of said members having calibrated marks to represent unbalance of at least two opposed portions of said blade, one of said members being movable relative to the other and disposed to designate the unbalance marks on said latter member, and means secured to said movable member at one end and to the center of the circle of the plate member at the other end, said means being provided to indicate at least two separate degree markings on said circle at the angular positions the weights are to be placed when the one calibrated unbalance indicating member is moved relative to the other unbalance indicating member to a fixed position to designate the determined unbalance in at least one portion of said rotary object.

3. A balance weight calculator for calculating the correct angular position of balance weights in a propeller blade to effect vertical balance thereof where unbalance has been determined, comprising a plate member having a circle on the face thereof inscribed in increments of degrees, an unbalance indicating member disposed on one side of the plate circle and having calibrated marks to designate the determined unbalance of said propeller in one plane, a manually movable member having calibrated marks perpendicular to said first named marks to designate on said indicating member the mark thereon of determined unbalance in another plane, and a plurality of arm members secured together at a plurality of pivot points with the length of each arm between pivots being equal and one pair of arms being pivoted to the center of the plate circle and the other pair of arms being secured to said movable member, the pair of arms pivoted to the plate circle being disposed to designate thereon the angular positions in degrees the balance weights are to be placed to correct the determined unbalance of the propeller blade when the movable member is manipulated.

4. A balance weight calculator for calculating the correct angular position of balance weights in a propeller blade to effect vertical balance thereof where unbalance has been determined, comprising a plate having a circle on the face thereof inscribed in increments of degrees, an edge strip member secured to the plate on one side of said circle and having calibrated marks to indicated unbalance in the propeller blade, the marks in one direction from the center line of the edge strip corresponding to a line through the center of the plate circle and indicating in increments of increasing value the unbalance the weights will correct in one portion of the blade and in similar increments in the other direction from the strip center line the unbalance the weights will correct in another portion of the blade, a movable member perpendicular to said edge strip member disposed to designate on said edge strip the mark thereon of determined unbalance, and means joined to and operated by said movable member to mechanically designate on said plate circle the angular positions in degrees the balance weights are to be placed to correct the determined unbalance of the propeller blade.

5. A balance weight calculator for calculating the correct angular position of balance weights in a propeller blade to effect vertical balance thereof where unbalance has been determined, comprising a plate having a circle on the face thereof inscribed in increments of degrees, an edge strip member secured to the plate on one side of said circle and having calibrated marks to indicate unbalance in the propeller blade, the marks in one direction from the center line of the edge strip corresponding to a line through the center of the plate circle and indicating in increments of increasing value the unbalance the weights will correct in one portion of the blade and in similar increments in the other direction from the strip center line the unbalance the weights will correct in another portion of the blade, a movable member perpendicular to said edge strip member disposed to designate on said edge strip the mark thereon of determined unbalance at right angles to the former direction of unbalance, and a plurality of arm members pivoted together at a plurality of pivot points with the length of each arm between pivots being equal and one pair of arms being secured to said movable member and the other pair of arms being secured to the center of the plate circle, the pair of arms secured to the plate circle designating thereon the angular positions the balance weights are to be placed to correct the determined unbalance of the propeller blade when the movable member is manipulated.

6. A balance weight calculator for calculating the correct angular position of balance weights in a propeller blade to effect vertical balance thereof where unbalance has been determined, comprising a plate having a circle on the face thereof inscribed in increments of degrees, an unbalance indicating slide disposed to be movable over the face of said circle and having calibrated marks to indicate unbalance in the propeller blade, the marks in one direction from a line through the middle of the slide and the center of the plate circle indicating in increments of increasing value the unbalance the weights will correct in one portion of the blade and in similar increments in the other direction from said center line the unbalance the weights will correct in another portion of the blade, a movable slider member provided in a longitudinal slot in said indicating slide and disposed to designate on said slide the mark thereon of determined unbalance, and a plurality of arm members pivoted together at a plurality of pivot points with the length of each arm between pivots being equal and one pair of arms being secured to said slider member and the other pair of arms being secured to the center of the plate circle, the pair of arms secured to the plate circle designating thereon the angular positions the balance weights are to be placed relative to each other to correct the determined unbalance of the propeller blade when the slide and slider are manipulated.

7. A balance weight calculator for calculating the correct angular position of balance weights in a propeller blade to effect vertical balance thereof where unbalance has been determined, comprising a plate having a circle on the face thereof inscribed in increments of degrees, an edge strip member secured to said plate at one side of said circle and having calibrated marks to indicate unbalance in inch pounds of a propeller blade, the marks in one direction from a line through the middle of the slide and the center of the plate circle indicating in inch pounds of increasing value the unbalance the weights will correct in the leading edge of the blade and in like inch pounds in the other direction from said center line the unbalance the weights will correct in the trailing edge of the blade, an unbalance indicating slide provided at right angles to said edge strip to move across the face of the circle to indicate on said edge strip the determined inch pounds unbalance in either the leading or trailing edge, said slide having calibrated marks to indicate unbalance in inch pounds of a propeller blade, the marks in one direction from a line through the middle of the slide and the center of the plate circle indicating in inch pounds of increasing value the unbalance the weights will correct in the camber foil of the blade and in like inch pounds in the other direction from said center line the unbalance the weights will correct in the face foil of the blade, a movable slider member provided in a longitudinal slot in the center of said slide to designate on said slide the mark thereon of determined unbalance, and a plurality of arm members pivoted together at a plurality of pivot points with the length of each arm between pivots being equal and one pair of arms being secured to said slider member and the other pair of arms being secured to the center of the plate circle, the pair of arms secured to the plate circle designating thereon the angular positions the balance weights are to be placed relative to each other to correct the determined unbalance of the propeller blade when the slide and slider are manipulated.

8. In a balance weight calculator for calculating the correct angular position of balance weights in a propeller blade to effect vertical balance thereof where unbalance has been determined, a base plate having a circle on the face thereof inscribed in increments of degrees, a pair of pointer arm members pivoted to the center of said circle and disposed to designate degrees thereon, a slide member movable across the face of the plate circle and calibrated in one direction from the center line thereof to designate units of unbalance in the camber foil of the blade and in the other direction from said line the units of unbalance in the face foil of the blade, a slider bar provided in a central slot in said slide member and disposed to designate the unit of determined unbalance whether in the face or camber foil, an additional pair of arm members pivoted to said slider bar at one end and to the pointer arms at the other end to thereby move the pointer arms to the degrees on said plate circle where the weights are to be placed to correct determined unbalance when the slider bar and slide member are moved to record the determined unbalance.

9. In a balance weight calculator for calculating on a circle defined on a plate member in increments of degrees from zero to 360 the correct angular position of balance weights in a propeller blade to effect vertical balance thereof where unbalance has been determined and having means to register the unbalance of the blade when determined, a pair of pointer arm members pivoted to the center of the plate circle and having pointers thereon to designate the degrees on said circle, another pair of arm members pivoted to said means at one end and to the other pointer arm members, respectively, at their corresponding other ends with the arm members thereby being joined to provide a parallelogram having a fixed distance between pivot points, the arm members being actuated by said means to move the pointer arm members to the degree positions the weights are to be placed to correct the determined unbalance.

10. In a balance weight calculator having a circle marked in increments of degrees from zero to 360 to designate the correct angular position of balance weights in a propeller blade to effect vertical balance thereof where unbalance has been determined, a pair of pointer arms pivoted to the center of said circle with one pointer arm equal to the unit value of one weight and the other pointer arm equal to the unit value of another weight, an edge strip at one side of the calculator to record determined unbalance in either the leading or trailing edge of the blade, a slide member perpendicular to the edge strip with calibrated marks to record determined unbalance in either the camber or face of the blade and disposed to indicate on said edge strip the unit of determined unbalance in either the leading or trailing edge, a slider bar provided in a longitudinal slot in the center of said slide member to designate thereon the unit of determined unbalance in either the camber or face of the blade, and arm members pivoted to said slider bar at one end and to the respective pointer arms at their corresponding other ends to move said pointer arms to the degree positions the balance weights are to be placed to correct determined unbalance in the blade when the slider bar and slide member are moved to the unit values of determined unbalance.

11. In a calculator for calculating the angular position of a pair of balance weights in a propeller blade to correct determined vertical unbalance thereof, a base plate having a circle on the face thereof inscribed in increments of degrees, a stationary strip for recording inch pounds unbalance of the blade in one direction, a movable member to record unbalance of the blade in another direction and to designate the inch pounds of unbalance on said stationary strip, and a plurality of arm members connected to the movable strip and to the center of the plate circle and pivoted together in a manner to form a parallelogram to mechanically project the parallelogram law of forces and thereby translate the determined unbalance designated on said strip members in inch pounds to degrees on said plate circle to indicate by a pair of said arms on said circle the angular positions at which the said balance weights are to be placed to correct the determined unbalance.

FREDERICK A. GRUETJEN.

(References on following page)

REFERENCES CITED

The following references are of record in the file of this patent:

UNITED STATES PATENTS

| Number | Name | Date |
|---|---|---|
| 1,648,733 | Karapetoff | Nov. 8, 1927 |
| 1,821,870 | Addison et al. | Sept. 1, 1931 |
| 1,895,347 | Solomon | Jan. 24, 1933 |
| 1,956,126 | Lundgren | Apr. 24, 1934 |
| 2,045,621 | Spitzglass et al. | June 30, 1936 |
| 2,334,404 | Garrett | Nov. 16, 1943 |
| 2,344,834 | Sites | Mar. 21, 1944 |
| 2,424,877 | Crawford | July 29, 1947 |

FOREIGN PATENTS

| Number | Country | Date |
|---|---|---|
| 154,219 | Switzerland | July 16, 1932 |
| 445,399 | France | Nov. 9, 1912 |
| 668,791 | France | July 22, 1929 |